United States Patent [19]

Barr

[11] Patent Number: 4,933,528
[45] Date of Patent: Jun. 12, 1990

[54] BACON HOLDER FOR MICROWAVE OVEN

[76] Inventor: Alton Barr, 236 Red Oak Rd., Bryon, Ga. 31008

[21] Appl. No.: 432,217

[22] Filed: Nov. 6, 1989

[51] Int. Cl.⁵ .............................................. H05B 6/80
[52] U.S. Cl. ........................... 219/10.55 E; 99/421 H; 99/446; 99/448; 99/DIG. 14
[58] Field of Search .................. 219/10.55 E, 10.55 R, 219/10.55 F; 99/419, 421 R, 421 H, 421 HH, 444, 445, 446, 447, 448, 449, 451, DIG. 14, 441

[56] References Cited

U.S. PATENT DOCUMENTS

| | | | |
|---|---|---|---|
| 3,915,309 | 10/1975 | Brazdo | 99/448 |
| 4,074,102 | 2/1978 | Asen | 219/10.55 E |
| 4,112,833 | 9/1978 | Oda et al. | 99/DIG. 14 |
| 4,121,510 | 10/1978 | Frederick | 219/10.55 E |
| 4,232,596 | 11/1980 | Kroll et al. | 99/448 |
| 4,272,663 | 6/1981 | Green | 219/10.55 E |
| 4,343,978 | 8/1982 | Kubiatowicz | 219/10.55 E |

Primary Examiner—Philip H. Leung
Attorney, Agent, or Firm—Thomas & Kennedy

[57] ABSTRACT

A meat holding tray for supporting strips of meat such as bacon as the meat is being cooked in a microwave oven comprises a tray having a plurality of separator plates extending upwardly parallel to one another above the surface of the tray mounted upon holding racks. Slots are formed by the separation of the upwardly extending plates. Strips of meat are placed within the slots for cooking and are pinned in place by a skewer extending through an opening in each separator plate and engaging the strip of meat resting within each slot.

12 Claims, 1 Drawing Sheet

BACON HOLDER FOR MICROWAVE OVEN

FIELD OF THE INVENTION

The present invention relates to apparatus for separating and holding strips of meat products as they are being cooked, and more particularly to apparatus for separating and holding strips of bacon as the strips are cooked in a microwave oven.

BACKGROUND OF THE INVENTION

Generally, as strips of bacon are cooked, the bacon has a tendency to shrink in size, to curl and to soak up a considerable amount of the grease in which it is being cooked and which is produced by the bacon itself during cooking. Additionally, if several pieces of bacon are cooked together, there is a tendency for the pieces to cling together if not kept separate. The use of microwave ovens has considerably decreased the amount of time needed to cook food such as bacon, but has done little to overcome the problems of shrinkage, curling and sticking together.

Cooking racks or trays such as those disclosed in U.S. Pat. Nos. 3,915,309 and 4,232,596 disclose the concept of separating items of food during the cooking or cooling of the items. However, these conventional racks do not address the problems of shrinkage or absorption of grease.

SUMMARY OF THE INVENTION

The present invention is a cooking tray for supporting and separating strips of meat such as bacon as the meat is cooked in a microwave oven. The cooking tray comprises a rectangular base platform with raised side walls. Attached to the sides of the platform are handles for use in picking up and carrying the cooking tray. Mounted upon the top surface of the tray are a plurality of meat holding racks for holding the strips of meat during cooking. Each of these holding racks has a plurality of separator plates extending upwardly away from the surface of the platform and the top of the holding racks. The separator plates are arranged at spaced intervals apart from each other, forming slots between each separator plate. The slots formed between the separator plates mounted upon each holding rack are aligned with the slots between the separator plates of the other two holding racks. During use, a strip of meat is placed longitudinally between these aligned slots resting on the top surface of the holding racks and held in place by skewers extending through holes in the center of the separator plates on each holding rack. Thus, the strips of meat are held well above the surface of the platform out of contact with the grease that collects there during cooking. Additionally, the skewers hold the strips firmly in place retarding the tendency of the strips to shrink during cooking.

Thus, it is an object of this invention to provide a means for reducing the shrinkage and absorption of grease by strips of meat during the cooking of the meat in a microwave oven.

It is another object of the invention to provide an improved cooking tray for supporting strips of meat or the like in a parallel vertically oriented array while the meat is being cooked. Other objects, features and advantages of the present invention will become apparent upon reading the following specification when taken in conjunction with the accompanying drawings.

DETAILED DESCRIPTION

Figure 1:
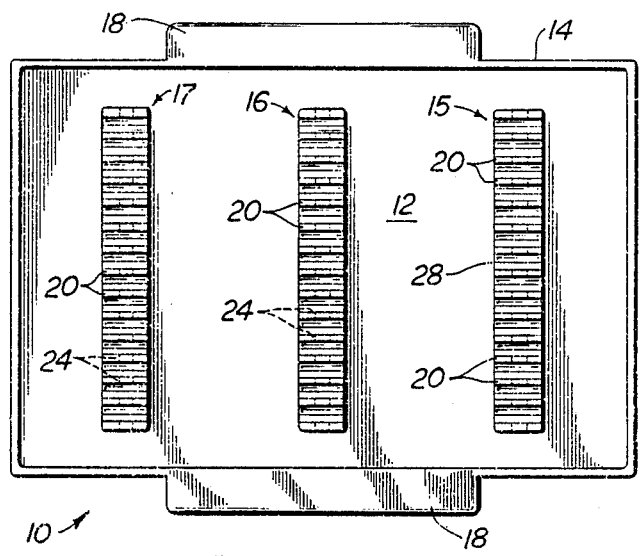
FIG. 1 is a plan view of the cooking tray of the present invention.

Referring now in more detail to the drawings in which like numerals indicate like parts throughout the several views, FIG. 1 illustrates a cooking tray 10 which comprises a rectangular cooking platform or base 12 having four raised perimeter flanges 14 creating continuous perimeter side wall extending upwardly from the platform 12. As shown, the raised perimeter flanges 14 define the four sides of a rectangular box with the platform 12 as the bottom of the box. Grease is collected within the box area defined by the perimeter flanges 14 on the sides and the platform 12 on the bottom as it drips off the strips of meat during cooking.

Figure 2:
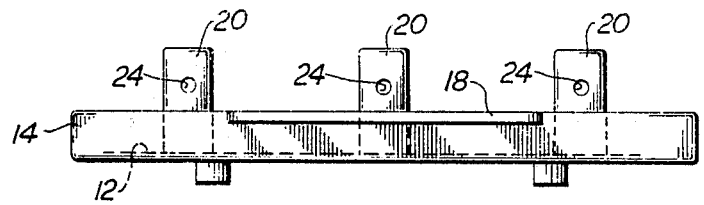
FIG. 2 is a side elevational view of the cooking tray of FIG. 1.
Figure 3:
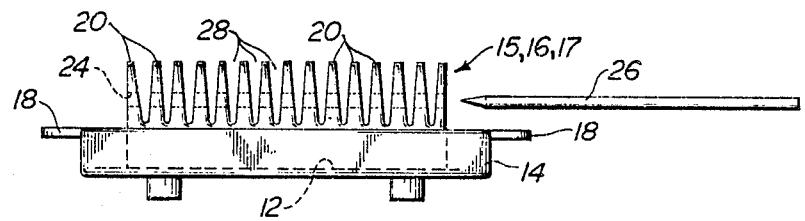
FIG. 3. is an end view of the cooking tray with the opening in each separating member for the skewer shown in broken lines.

Affixed to the surface of the platform 12 within the area bounded by perimeter flanges 14 are meat holding racks 15, 16 and 17, each of which, as illustrated in FIGS. 2 and 3, has a plurality of parallel members functioning as separator plates 20 which extend upwardly away from the platform 12 of the working tray 10. The separator plates 20 on each rack are spaced apart from each other to form slots 28 therebetween having sloping sides, as shown. The slots 28 on each holding rack are the corresponding slots 2 on the other two holding racks so that strips of meat placed within the slots 28 extend across the cooking tray without bending or kinking.

Approximately centrally located in each separator plate 20 is a skewer opening 24, as best seen in FIGS. 2 and 3, and the openings 24 in the array of separator plates 20 on each of the holding racks 15, 16 and 17 are aligned so that a skewer 26 may pass through all of the separator plates 20 on a holding rack. In an additional embodiment, this skewer opening 24 may also be a slot or depression formed in the top of each separator plate 20 on each of the holding racks 15, 16 and 17 upon which the skewer 26 rests in engagement with the strips of meat.

Figure 4:
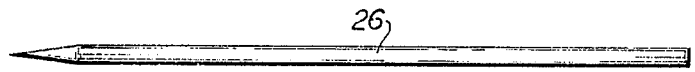
FIG. 4. is a side view of the skewer, for use with the cooking tray of FIGS. 1 through 3.

When the cooking tray 10 is in use, single strips of meat such as bacon, are placed longitudinally along the length of the tray 10 with each strip inserted within the aligned slots 28 between the separator plates 20 of the holding trays 15, 16 and 17. A skewer 26 (FIG. 4) is inserted through the skewer openings 24 (FIG. 3) of each separator plate 20 on each holding rack 15, 16 and 17 as well as through the portion of the strips of meat positioned within each slot 25 between each of the separator plates 20. The strips of meat positioned within the slots 28 are arranged standing on one side edge resting on the top surfaces of the holding racks 15, 16 and 17 within the slots 28 on each holding rack 15, 16 and 17. The strips of meat are pinned firmly in place within the slots 28 between each separator plate 20 on each rack 15, 16 and 17 by the skewer 26 with each skewer 26 passing through all of the strips. As the meat cooks, the grease and other liquids created by the meat tend to drip down off of the strips of meat and are collected on the platform 12 within the box area between the perimeter flanges 14.

Thus, the strips of meat are held well above the surface of platform 12 and are kept out of contact with the grease collecting in the box area formed by the platform 12 and the perimeter flanges 14. This prevents the meat from soaking in the grease and absorbing a large amount of the grease. Additionally, the pinning action of the skewers 26 engaging and holding the meat within the slots 28 between the separator plates 20 retards the tendency of the meat to shrink or to curl during cooking, and the separator plates 20 maintain the spacing of the strips to keep the strips separate and out of clinging contact with one another.

From the foregoing, it can be seen that the present invention comprises an improved meat cooking tray especially for use in a microwave oven or the like. Numerous additions, deletions and modifications may be made thereto without departing from the spirit and scope of the novel invention as set forth in more detail in the following claims.

What is claimed is:

1. An apparatus for holding strips of meat during cooking, comprising, in combination:
   a base platform;
   a plurality of holding racks mounted upon said platform for supporting strips of meat above said platform;
   each of said holding racks having a plurality of separator plates for separating the strips of meat being supported by said holding racks; and
   a skewer member for removably extending through said separator plates of each holding rack to maintain the position of the strips of meat between said separator plates upon said holding racks.

2. The apparatus for holding strips of meat as recited in claim 1 wherein each of said separator plates comprises an upright protrusion extending upwardly away from said base platform, with said protrusion formed parallel to one another and each of said protrusions defining an opening through the center portion thereof for accepting one of said skewer members.

3. The apparatus for holding strips of meat as recited in claim 1 wherein said skewer member comprises a longitudinal rod of a length approximately equal to the width of said platform for extending through said separator plates to pin and maintain the position of the strips of meat between said separator plates.

4. The apparatus for holding strips of meat as recited in claim 1 wherein said separator plates on each of said holding racks are sequentially spaced apart from one another to form holding slots on each of said holding racks for separating and isolating the strips of meat from one another.

5. The apparatus for holding strips of meat as recited in claim 4 wherein said holding slots between said separator plates on each of said holding racks are aligned with the corresponding slots in the other holding racks for allowing strips of meat of a length approximately equal to the length of said platform to be placed longitudinally between said aligned holding slots on each of said holding racks.

6. The apparatus for holding strips of meat as recited in claim 1 wherein said base platform comprises a rectangular plate, upwardly extending perimeter flanges along the side edges of said rectangular plate for containing grease formed by the strips of meat during cooking, and a pair of handles mounted opposite one another upon an outside surface of two of said perimeter flanges for gripping and carrying said platform.

7. A cooking tray for holding strips of meat during cooking of the meat comprising:
   a base platform with a perimeter rim extending upwardly therefrom;
   a plurality of upright parallel support plates each supported at their lower portions by said base platform and all of said plates bounded by said rim;
   said plates defining with one another elongated slots for receiving strips of meat; and
   aligned openings formed in said plates for insertion therethrough of skewers for impaling and supporting the strips of meat in said slots.

8. The cooking tray of claim 7 and wherein said plurality of upright parallel support plates comprise an array of support protrusions arranged in aligned columns and in lateral rows with an opening formed in the upper portion of each protrusion for insertion therethrough of a skewer.

9. The cooking tray of claim 8 and further including a mounting platform for each lateral row of support protrusions mounted to said base platform with each row of protrusions mounted on and extending upwardly from one of said mounting platforms, whereby said mounting platforms and protrusions hold the strips of meat above said base platform and the liquids cooked from the meat will drain downwardly from the meat to said base platform of the cooking tray.

10. The cooking tray of claim 9 wherein each of said protrusions has sloping sides.

11. A cooking tray comprising:
   a base platform having perimeter side walls extending upwardly therefrom;
   a plurality of holding racks, each of said holding racks having a plurality of parallel members forming separator plates extending upwardly in a direction away from said base platform;
   said separator plates on each holding rack being spaced apart to form an array of slots therebetween for receiving strips of meat;
   the slots of each of said holding racks being aligned with the slots on the remainder of said holding racks;
   each of said separator plates on a holding rack having an aperture extending therethrough;
   said apertures being aligned with each other for receiving therethrough skewer members for engaging and supporting the strips of meat within said slots.

12. A cooking tray as claimed in claim 11 wherein said slots have sloping sides.

* * * * *